United States Patent
Pan et al.

(10) Patent No.: US 12,189,241 B2
(45) Date of Patent: Jan. 7, 2025

(54) ELECTRONIC DEVICE

(71) Applicant: Innolux Corporation, Miao-Li County (TW)

(72) Inventors: May Pan, Tainan (TW); Maggy Hsu, Magong (TW)

(73) Assignee: Innolux Corporation, Miao-Li County (TW)

( * ) Notice: Subject to any disclaimer, the term of this patent is extended or adjusted under 35 U.S.C. 154(b) by 0 days.

(21) Appl. No.: 17/894,963

(22) Filed: Aug. 24, 2022

(65) Prior Publication Data

US 2022/0413332 A1    Dec. 29, 2022

Related U.S. Application Data

(63) Continuation of application No. 16/905,967, filed on Jun. 19, 2020, now abandoned.

(51) Int. Cl.
| | |
|---|---|
| *G02F 1/1339* | (2006.01) |
| *G02F 1/1333* | (2006.01) |
| *G02F 1/1337* | (2006.01) |
| *G02F 1/1362* | (2006.01) |

(52) U.S. Cl.
CPC ........ *G02F 1/13394* (2013.01); *G02F 1/1337* (2013.01); *G02F 1/136209* (2013.01); *G02F 1/136286* (2013.01); *G02F 1/133357* (2021.01)

(58) Field of Classification Search
CPC . G02F 1/1339; G02F 1/13394; G02F 1/13396
See application file for complete search history.

(56) References Cited

U.S. PATENT DOCUMENTS

| | | | |
|---|---|---|---|
| 2009/0289260 A1* | 11/2009 | Sonoda ............. | G02F 1/134309 438/34 |
| 2013/0235294 A1* | 9/2013 | Nomura ............. | G02F 1/13394 438/30 |
| 2017/0293174 A1* | 10/2017 | Tai ........................ | G02F 1/1368 |
| 2017/0315415 A1* | 11/2017 | Yang .................. | G02F 1/133512 |
| 2017/0357115 A1* | 12/2017 | Jeon .................... | H01L 27/1288 |
| 2018/0088403 A1* | 3/2018 | Joo ................... | G02F 1/133707 |

FOREIGN PATENT DOCUMENTS

CN          109427821 A  *  3/2019  .......... G02F 1/1362

* cited by examiner

*Primary Examiner* — Alexander P Gross
(74) *Attorney, Agent, or Firm* — Patterson + Sheridan, LLP

(57) ABSTRACT

An electronic device is provided, which includes a first substrate, a second substrate, a data line, a first spacer, and a second spacer. The first spacer and the data line are on the first substrate, and the second spacer is on the second substrate and between the first spacer and the second substrate. Part of the first spacer does not overlap with the second spacer, and the first spacer includes a first portion, a second portion, and a third portion. The first portion overlaps with the second spacer. The first portion connects between the second portion and the third portion. The data line has a first part and a second part. The first part overlaps with the first portion. The second part does not overlap with the first portion. A maximum width of the first part is less than a maximum width of the second part.

20 Claims, 8 Drawing Sheets

ELECTRONIC DEVICE

CROSS REFERENCE TO RELATED APPLICATIONS

This application is a Continuation of pending U.S. patent application Ser. No. 16/905,967, filed Jun. 19, 2020 and entitled "ELECTRONIC DEVICE", the entirety of which is incorporated by reference herein.

BACKGROUND

Technical Field

The present disclosure relates to an electronic device, and in particular it relates to an electronic device with a spacer.

Description of the Related Art

Electronic products equipped with display panels have become indispensable necessities in modern society. With the flourishing development of these portable electronic products, consumers have high expectations regarding their quality, functionality, and price.

Electronic products, such as smartphones, tablet computers, notebook computers, displays, and televisions, have become indispensable products in daily life. The electronic products (such as displays) have not yet met consumer expectations in various aspects (such as quality and function). For example, the panels in electronic products have spacers. When the panel is subjected to external forces, the spacers may shift or affect the layer (such as the alignment layer) disposed on the opposite substrate, thereby affecting its quality or performance. Therefore, the development of a design that can improve the above problems is still one of the topics that the industry is devoted to research.

SUMMARY

In accordance with some embodiments of the present disclosure, an electronic device is provided. The electronic device includes a first substrate, a second substrate, a data line, a first spacer, and a second spacer. The second substrate is disposed opposite to the first substrate. The data line is disposed on the first substrate. The first spacer is disposed on the first substrate, and the second spacer is disposed on the second substrate and between the first spacer and the second substrate. Part of the first spacer does not overlap with the second spacer. The first spacer includes a first portion, a second portion and a third portion. The first portion overlaps with the second spacer in a normal direction of the first substrate. The first portion connects between the second portion and the third portion. The data line has a first part and a second part. The first part overlaps with the first portion. The second part does not overlap with the first portion. In addition, a maximum width of the first part is less than a maximum width of the second part.

A detailed description is given in the following embodiments with reference to the accompanying drawings.

BRIEF DESCRIPTION OF THE DRAWINGS

The disclosure may be more fully understood by reading the subsequent detailed description and examples with references made to the accompanying drawings, wherein.

DETAILED DESCRIPTION

Figure 1:
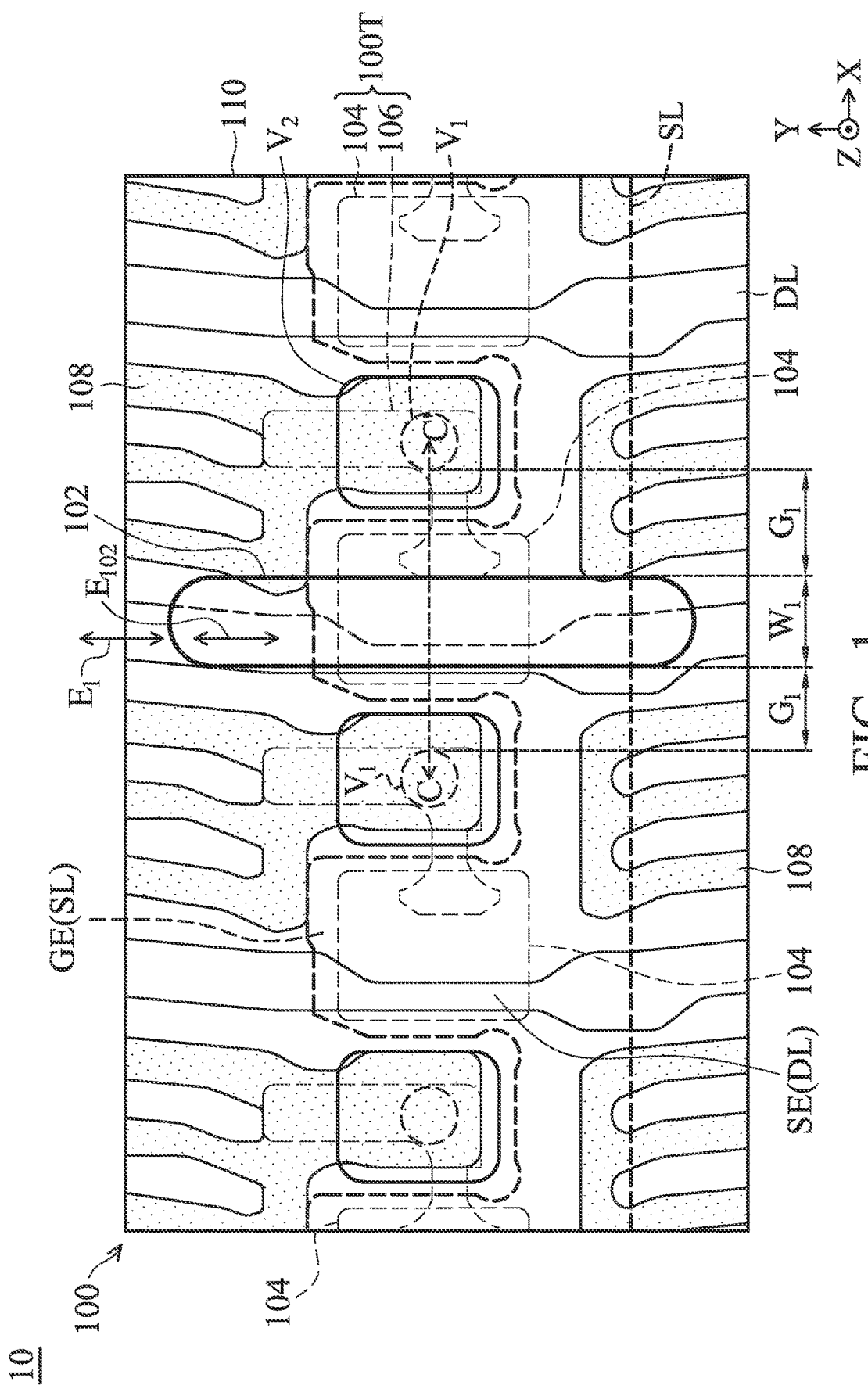
FIG. 1 is a schematic partial top-view diagram of an electronic device in accordance with some embodiments of the present disclosure.

The electronic device of the present disclosure is described in detail in the following description. It should be understood that in the following detailed description, for purposes of explanation, numerous specific details and embodiments are set forth in order to provide a thorough understanding of the present disclosure. The elements and configurations described in the following detailed description are set forth in order to clearly describe the present disclosure. The embodiments are used merely for the purpose of illustration. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments.

The present disclosure can be understood by referring to the following detailed description in connection with the accompanying drawings. It should be noted that, in order to allow the reader to easily understand the drawings, several drawings in the present disclosure only depict a portion of the electronic device, and the specific elements in the drawings are not drawn to scale. In addition, the number and size of each element in the drawings are only for illustration, and are not limited the scope of the present disclosure.

Throughout the present disclosure and the appended claims, certain terms are used to refer to specific elements. Those skilled in the art should understand that electronic device manufacturers may refer to the same element with different names. The present disclosure does not intend to distinguish between elements that have the same function but different names. In the specification and claims, the terms "comprising", "including", "having" and the like are open-ended phrases, so they should be interpreted as "including but is not limited to . . . ". Therefore, when the terms "comprising", "including" and/or "having" are used in the description of the present disclosure, they specify the corresponding features, regions, steps, operations and/or components, but do not exclude the existence of one or more corresponding features, regions, steps, operations and/or components.

Directional terms mentioned in the present disclosure, such as "upper", "lower", "front", "rear", "left", "right", etc., are only the directions referring to the drawings. Therefore, the directional terms are used for illustration, not for limiting the present disclosure. In the drawings, each drawing depicts general features of methods, structures, and/or materials used in particular embodiments. However, these drawings should not be interpreted as defining or limiting the scope or property encompassed by these embodiments. For example, for clarity, the relative sizes, thicknesses, and positions of the various layers, regions, and/or structures may be reduced or enlarged.

When a corresponding component (such as a layer or region) is referred to as "(disposed or located) on another component", it may be directly (disposed or located) on another component, or there may be other components between them. On the other hand, when a component is referred to as "directly (disposed or located) on another component", there is no component existing between them. In addition, when a component is referred to as "(disposed or located) on another component", the two have an upper-lower relationship in a top-view direction, and this component may be above or below another component, and the upper-lower relationship depends on the orientation of the device.

The terms "about", "equal to", "the same as", "identical to", "substantially" or "approximately" are generally interpreted as being within 20% of a given value or range, or within 10%, 5%, 3%, 2%, 1% or 0.5% of the given value or range.

The ordinal numbers used in the specification and claims, such as the terms "first", "second", etc., are used to modify an element, which itself does not mean and represent that the element (or elements) has any previous ordinal number, and does not mean the order of a certain element and another element, or the order in the manufacturing method. The use of these ordinal numbers is used to make a component with a certain name can be clearly distinguished from another component with the same name. The same words may not be used in the claims and the specification. Accordingly, the first component in the specification may be the second component in the claims.

It should be noted that the following embodiments can replace, recombine, and mix features in several different embodiments to complete other embodiments without departing from the spirit of the present disclosure. The features between the various embodiments can be mixed and used arbitrarily as long as they do not violate or conflict the spirit of the present disclosure.

In the present disclosure, the length and the width of the component can be measured from an optical microscope image, and the thickness of the component can be measured from a cross-sectional image in an electron microscope, but it is not limited thereto. In addition, certain errors may exist between any two values or directions used for comparison. If the first value is equal to the second value, it implies that there may be an 10% error between the first value and the second value; if the first direction is perpendicular to the second direction, the angle between the first direction and the second direction may be between 80 degrees and 100 degrees; if the first direction is parallel to the second direction, the angle between the first direction and the second direction may be between 0 degrees and 10 degrees.

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In accordance with some embodiments of the present disclosure, the provided electronic device includes spacers with a large buffer space for displacement. In detail, for example, spacers (such as the first spacer and the second spacer as follows) are disposed on the two substrates respectively, and these spacers may contact or intersect each other, and these spacers respectively have part that overlaps with the opposite spacer and other parts that do not overlap with the opposite spacers. In addition, the area (or length) of the non-overlapping part (or portion) may be greater than or equal to the area (or length) of the overlapping part (or portion). When the panel is subjected to external force, the above design can reduce the slippage of the spacers due to displacement, which affecting other layers (for example, alignment layer, but it is not limited thereto) on the opposite substrate. For example, when the spacer shifts and slips, and scratches the alignment layer disposed on the opposite substrate, or uneven alignment may occur.

In accordance with some embodiments of the present disclosure, the electronic device may include a display device, a light-emitting device, a touch device, a sensing device, an antenna device or a tiled device (a tiled device having any of the above functions or a hybrid function), but it is not limited thereto. The electronic device may include a bendable electronic device or a flexible electronic device, but it is not limited thereto. For example, the electronic device may include, liquid-crystal, light-emitting diode (LED), quantum dot (QD), fluorescence, phosphor, other suitable materials or a combination thereof. For example, the light-emitting diode may include organic light-emitting diode (OLED), micro-LED, micro-LED, mini-LED or quantum dot light-emitting diode (QLED, QDLED), but it is not limited thereto. In some embodiments, the electronic device may include a panel and/or a backlight module. The panel includes a liquid-crystal panel, but it is not limited thereto. It should be understood that the liquid-crystal display device will be taken as an example to illustrate the disclosed electronic device, but it is not limited thereto.

Figure 2:
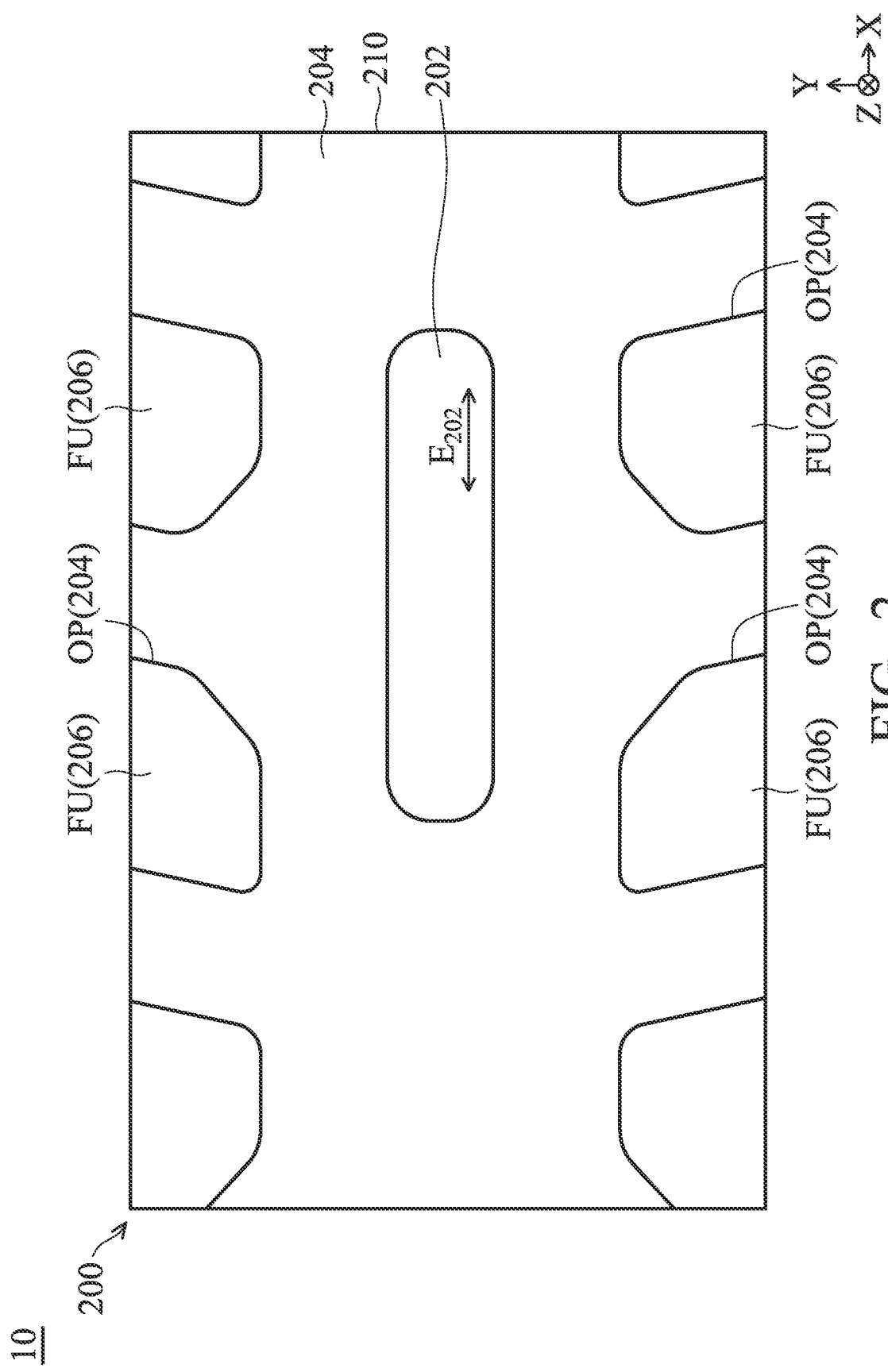
FIG. 2 is a schematic partial top-view diagram of an electronic device in accordance with some embodiments of the present disclosure.
Figure 3:
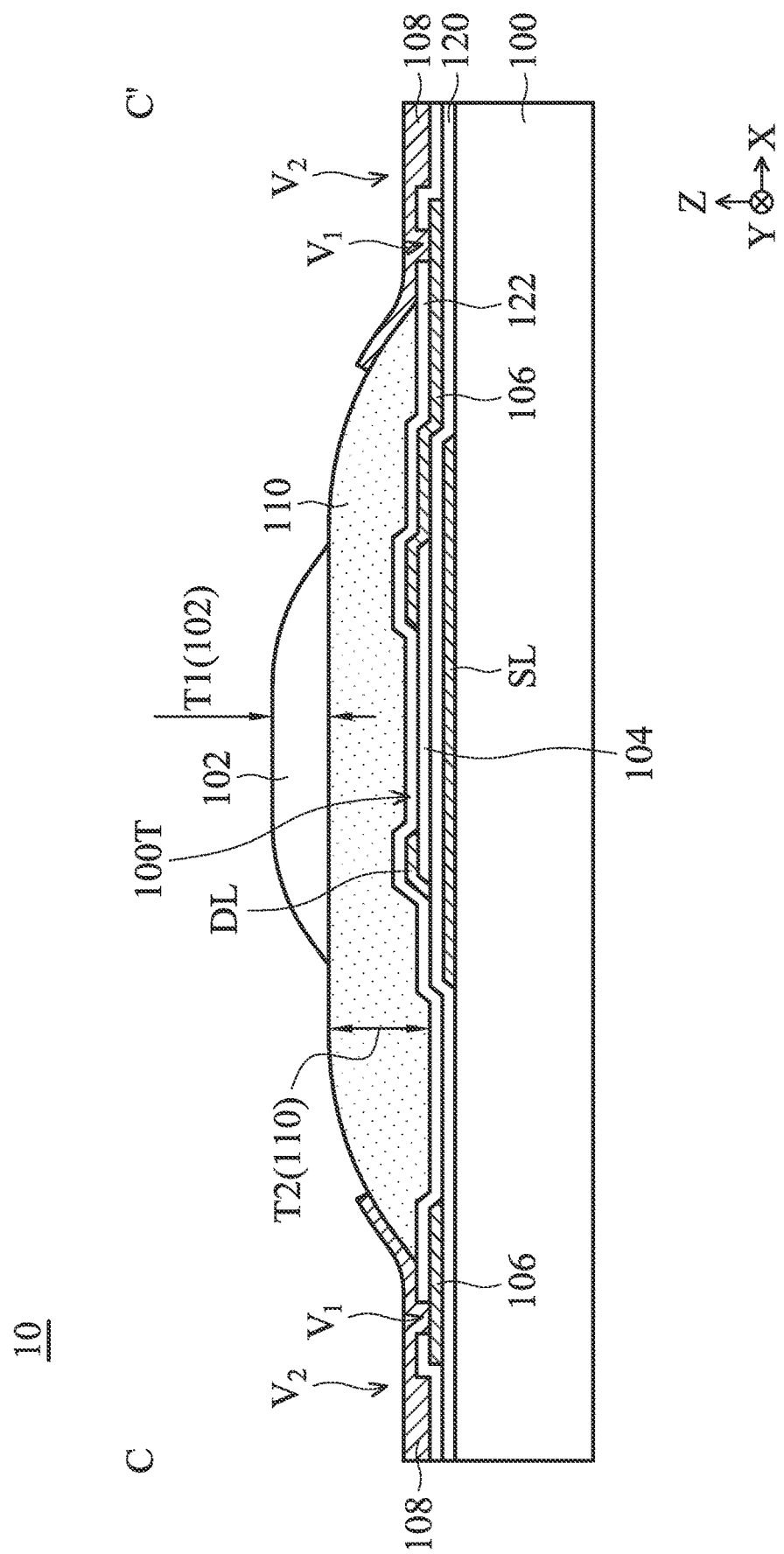
FIG. 3 is a schematic cross-sectional diagram of an electronic device taken along section line C-C' in the embodiment of FIG. 1 of the present disclosure.

Refer to FIG. 1, FIG. 2 and FIG. 3, FIG. 1 is a schematic partial top-view diagram of an electronic device 10 in accordance with some embodiments of the present disclosure. FIG. 2 is a schematic partial top-view diagram of the electronic device 10 in accordance with some embodiments of the present disclosure. FIG. 3 is a schematic cross-sectional diagram of the electronic device 10 taken along segment line C-C' in the embodiment of FIG. 1. It should be understood that, some elements in the electronic device 10 are omitted in FIG. 1, FIG. 2, and FIG. 3, and only some elements formed or disposed on the first substrate 100 or the second substrate 200 are schematically shown for clarity. In accordance with some embodiments, additional features or elements may be added to the electronic device 10. In some embodiments, some features of the electronic device 10 described below may be optionally replaced or omitted.

Referring to FIG. 1, FIG. 2, and FIG. 3, the electronic device 10 includes a first substrate 100, a second substrate 200, a first spacer 102 and a second spacer 202. In some embodiments (also refer to FIG. 6), the second substrate 200 is disposed opposite to the first substrate 100, the first spacer 102 is disposed on the first substrate 100, and the second spacer 202 is disposed on the second substrate 200 and between the first spacer 102 and the second substrate 200. In some embodiments, the materials of the first substrate 100 and/or the second substrate 200 may include, but is not limited to, glass, quartz, sapphire, ceramic, polyimide (PI), polycarbonate (PC), photosensitive polyimide (PSPI), polyethylene terephthalate (PET), other suitable materials or a combination thereof.

Referring to FIG. 1, in some embodiments, the first substrate 100 can be used as a driving substrate (or an array substrate), but it is not limited thereto. In some embodiments, the electronic device 10 may include a driving circuit (not illustrated) disposed on the first substrate 100. The driving circuit may include an active driving circuit or a passive driving circuit. In some embodiments, the electronic device 10 includes a plurality of data lines DL and a plurality of scan lines SL (e.g., indicated by bold dotted lines) disposed on the first substrate 100. The data lines DL and the scan lines SL are intersected to define a plurality of pixel units (e.g., sub-pixels, not illustrated), these pixel units have transistors 100T, which respectively includes, but is not limited to, switching transistors or driving transistors. Refer to FIG. 1, in some embodiments, the transistor 100T includes a semiconductor layer 104 (thin dotted line), a source electrode SE (e.g., a part of the data line DL, and the source electrode SE may at least overlap with the semiconductor layer 104), a drain electrode 106 and a gate electrode GE (e.g. a part of the scan line SL). The gate electrode GE is connected to the scan line SL, and the gate electrode GE may extend along the Y direction and protrude from the scan line SL, the source electrode SE, the drain electrode 106 and the gate electrode GE all may at least partially overlap with the semiconductor layer 104.

As shown in FIG. 3, in some embodiments, the scan line SL and/or the gate electrode GE are disposed on the first substrate 100, and a first dielectric layer 120 is disposed (or covered) on the scan line SL and/or the gate electrode GE. The semiconductor layer 104 is disposed on the first dielectric layer 120, the drain electrode 106, the source electrode SE, and/or the data line DL are disposed on the first dielectric layer 120. In addition, in a normal direction (e.g., the Z direction) of the first substrate 100, the drain electrode 106 and the source electrode SE partially overlap with the semiconductor layer 104 and the scanning line SL (e.g., the gate electrode GE). In some embodiments, a second dielectric layer 122 is disposed on the first dielectric layer 120, and is disposed or covered on the semiconductor layer 104, the drain electrode 106, the source electrode SE, and/or the data line DL. In some embodiments, a planarization layer 110 is disposed on the second dielectric layer 122, and the planarization layer 110 may be disposed on the scan line SL, the data line DL, the semiconductor layer 104, and/or the drain electrode 106. In other words, the planarization layer 110 may cover the transistor 100T. In some embodiments, the first dielectric layer 120 and/or the second dielectric layer 122 may serve as an inter-layer dielectric (ILD). In some embodiments, the material of the first dielectric layer 120 and/or the second dielectric layer 122 may include, but is not limited to, silicon nitride, silicon oxide, silicon oxynitride, aluminum oxide, other suitable materials or a combination thereof. In some embodiments, the planarization layer 110 may include, but is not limited to, organic materials, inorganic materials, other suitable materials, or a combination thereof. For example, the inorganic material may include silicon nitride, silicon oxide, silicon oxynitride, aluminum oxide, other suitable materials or a combination thereof, but it is not limited thereto. For example, the organic material may include epoxy resins, silicone resins, acrylic resins (such as polymethylmetacrylate (PMMA)), polyimide, perfluoroalkoxy alkane (PFA), other suitable materials or a combination thereof, but it is not limited thereto.

Referring to FIG. 1 and FIG. 3 at the same time, in some embodiments, the second dielectric layer 122 has a plurality of first through holes $V_1$, and in a normal direction of the first substrate 100, these first through holes $V_1$ overlap with at least a portion of the drain electrodes 106. For example, the first through hole $V_1$ may penetrate the second dielectric layer 122 and expose a portion of the drain electrode 106. In some embodiments, the pixel unit of the electronic device 10 may include a pixel electrode 108. For example, the pixel electrode 108 may be disposed on a portion of the second dielectric layer 122 and/or a portion of the planarization layer 110. The planarization layer 110 has a plurality of second through holes $V_2$. In the Z direction, these second through holes $V_2$ overlap with the first through holes $V_1$, and the pixel electrode 108 may be electrically connected to the transistor 100T (e.g., the drain electrode 106) through the second through holes $V_2$ and/or the first through holes $V_1$, but it is not limited thereto. In some embodiments, the material of the pixel electrode 108 may include a metal conductive material, a transparent conductive material, other suitable materials or a combination thereof, but it is not limited thereto.

Referring to FIG. 3, in some embodiments, the first spacer 102 may be disposed on the planarization layer 110. In some embodiments, a thickness T1 of the first spacer 102 may be less than or equal to a thickness T2 of the planarization layer 110. The thickness T1 may be defined by a maximum thickness of the first spacer 102 in the Z direction in a cross-sectional image, and the thickness T2 may be defined by a maximum thickness of the planarization layer 110 in the Z direction in a cross-sectional image. In some embodiments, the first spacer 102 is disposed on the planarization layer 110, and the first spacer 102 is not disposed in the first through hole $V_1$ and/or the second through hole $V_2$, the first spacer 102 has a more planar structure to reduce the slippage of the second spacer 202 when an external force is applied thereto.

Referring to FIG. 1 and FIG. 3, in some embodiments, the first spacer 102 may be located between two adjacent first through holes $V_1$. In some embodiments, in a normal direction (e.g., the Z direction) of the first substrate 100, the first through hole $V_1$ does not overlap with the first spacer 102. In some embodiments, the first spacer 102 may be located between two adjacent second through holes $V_2$. In some embodiments, in the normal direction of the first substrate 100, the second via hole V2 does not overlap with the first spacer 102. In some embodiments, a distance $G_1$ between the first spacer 102 and the first through hole $V_1$ may be greater than or equal to 5 micrometers (μm) (distance $G_1 \geq 5$ micrometers), but it is not limited thereto. The distance $G_1$ may be defined by a minimum distance between the first spacer 102 and the first through hole $V_1$ in the X direction. In some embodiments, the distance $G_1$ may be greater than or equal to 6 micrometers (μm) (distance $G_1 \geq 6$ micrometers), and the distance $G_1$ may be greater than or equal to 6.5 micrometers, 7 micrometers, or 7.5 micrometers. In some embodiments, the distance $G_1$ may be greater than or equal to 0.5 times a width $W_1$ of the first spacer 102 (distance $G_1 \geq 0.5 * $ width $W_1$), but it is not limited thereto. In some embodiments, the distance G1 may be greater than or equal to 0.55 times the width W1 of the first spacer 102 (distance G1 0.55*width W1). In some embodiments, the distance $G_1$ may be, for example, greater than or equal to 0.6 times, 0.7 times, or 0.8 times the width $W_1$ of the first spacer 102. In some embodiments, the distance $G_1$ may be less than 2.5 times the width $W_1$ of the first spacer 102 (distance $G_1$<2.5*width $W_1$). The width $W_1$ may be defined by a maximum width of the first spacer 102 in a direction (for example, X direction) perpendicular to an extending direction $E_{102}$ of the first spacer 102. It should be understood that, the "extending direction" of an object refers to a direction along or substantially parallel to the long axis of the object. For example, the object can be encircled by a minimum rectangle, and the extending direction of the long side of the minimum rectangle is the direction of the long axis. In addition, the distance $G_1$ and the width $W_1$ can be measured in an image (for example an optical microscope image). For example, the width $W_1$ is obtained from measuring a maximum width between outer edges of the first spacer 102 in the direction perpendicular to the extending direction $E_{102}$. For example, the distance $G_1$ is obtained from measuring a minimum distance between the outer edge of the first spacer 102 and the inner edge of the first through hole $V_1$ in the direction perpendicular to the extending direction $E_{102}$.

Figure 4:
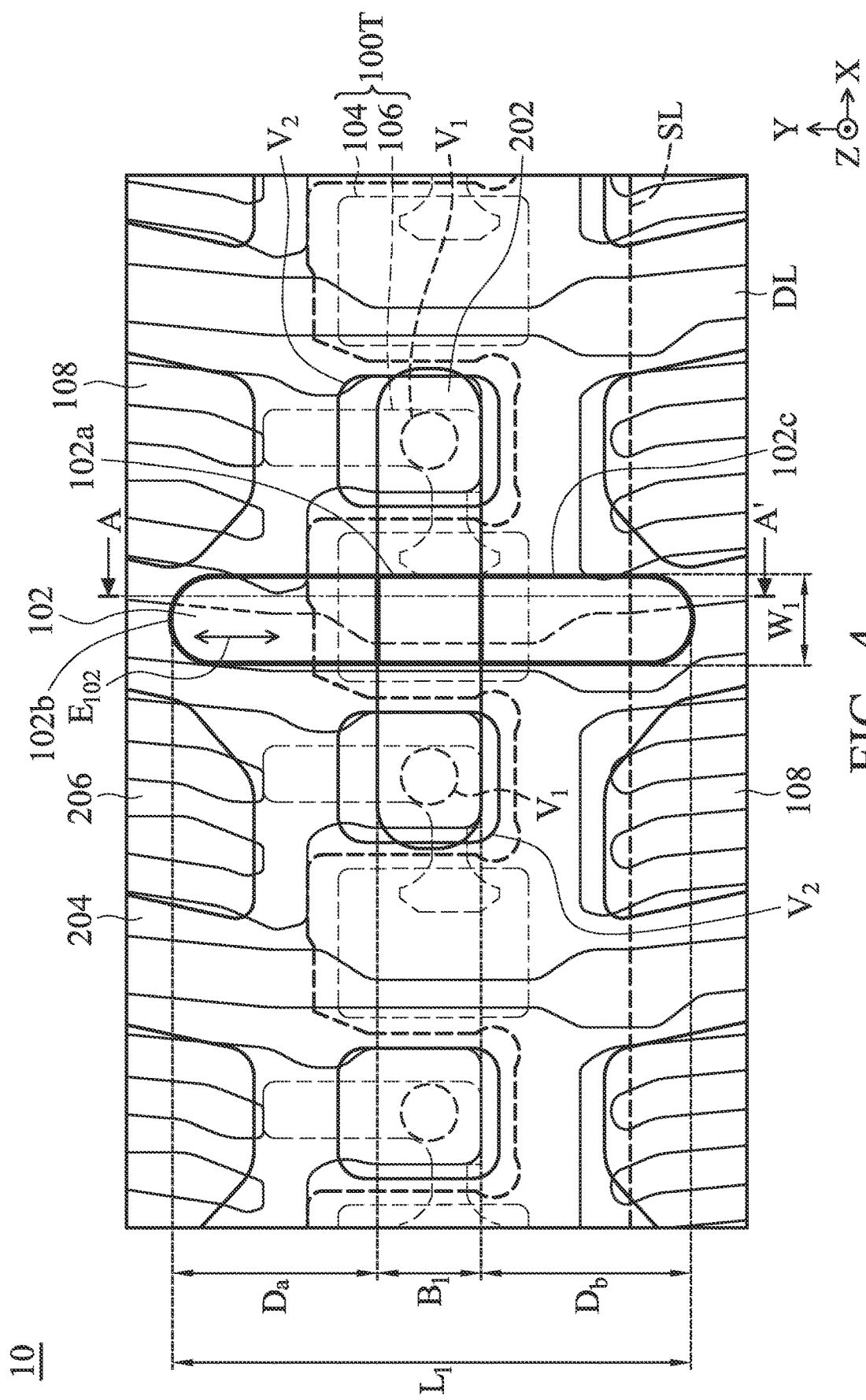
FIG. 4 is a schematic top-view diagram of an electronic device in accordance with some embodiments of the present disclosure.

It should be understood that although both the minimum distances between the first spacer 102 and the two adjacent first through holes $V_1$ in the drawing are denoted as $G_1$, in accordance with some other embodiments, the distances G1 between the first spacer 102 and the two adjacent first through holes $V_1$ may be the same or different. As described above, as shown in FIG. 1 to FIG. 3, the first spacer 102 and/or the second spacer 202 is disposed between the first substrate 100 and the second substrate 200, and the first spacer 102 and/or the second spacer 202 can serve as spacing elements. In some embodiments, the extending direction $E_{102}$ of the first spacer 102 is substantially the same as an extending direction $E_1$ of the data line DL, but it is not limited thereto. In some embodiments (not illustrated), an included angle θ1 between the extending direction $E_{102}$ of the first spacer 102 and the extending direction $E_1$ of the data line DL may be between about 5 degrees and about 40 degrees (5 degrees≤included angle θ1≤40 degrees), but it is not limited thereto. In some embodiments, in the normal direction of the first substrate 100, the first spacer 102 may overlap with the data line DL, and the above-mentioned "overlap with" means that the two at least partially overlap. Under the above design, the length of the first spacer 102 can be appropriately extended to increase the buffer space, and the first spacer 102 does not significantly occupy the aperture area of the pixel unit. Similarly, in some embodiments, the second spacer 202 may extend along an extending direction $E_{202}$. In some embodiments (as shown in FIG. 4), the extending direction $E_{102}$ of the first spacer 102 is different from the extending direction $E_{202}$ of the second spacer 202. In some embodiments (as shown in FIG. 4), the included angle θ between the extending direction $E_{102}$ of the first spacer 102 and the extending direction $E_{202}$ of the second spacer 202 may be between about 45 degrees and about 90 degrees (45 degrees≤included angle θ≤90 degrees), but it is not limited thereto. In some embodiments, the included angle θ between the extending direction $E_{102}$ of the first spacer 102 and the extending direction $E_{202}$ of the second spacer 202 may be between about 60 degrees and about 90 degrees (60 degrees≤included angle θ≤90 degrees). In some embodiments, the included angle θ between the extending direction $E_{102}$ of the first spacer 102 and the extending direction $E_{202}$ of the second spacer 202 may be between about 80 degrees and about 90 degrees (80 degrees≤included angle θ≤90 degrees).

In some embodiments, the material of the first spacer 102 and/or the second spacer 202 may include, but is not limited to, organic materials, inorganic materials, or a combination thereof. For example, the organic material may include epoxy resin, acrylic resin such as polymethylmetacrylate (PMMA), benzocyclobutene (BCB), polyethylene terephthalate (PET), polyethylene (PE), polyethersulfone (PES), polycarbonate (PC), other suitable materials or a combination thereof. In some embodiments, the material of the second spacer 202 may be the same as or different from the material of the first spacer 102. As shown in FIG. 2, in some embodiments, the second substrate 200 can be used as a color filter substrate, but it is not limited thereto. In some embodiments, the electronic device 10 may include a light-shielding layer 204 and/or a color filter layer 206 disposed on the second substrate 200, and the second spacer 202 may be disposed on the light-shielding layer 204. In addition, in the normal direction of the first substrate 100, the light-shielding layer 204 may overlap with or cover the second spacer 202. In some embodiments, the light-shielding layer 204 may include a black matrix, and the light-shielding layer 204 may have a plurality of openings OP. In addition, in the normal direction of the first substrate 100, the color filter layer 206 may overlap with the openings OP of the light-shielding layer 204. In some embodiments, the material of the light-shielding layer 204 may include, but is not limited to, black photoresist, black printing ink, black resin, metal, carbon black material, resin material, photosensitive material, other suitable materials or a combination thereof. In some embodiments, the color filter layer 206 may include a plurality of color filter units FU. For example, the color filter units FU may include red filter units, green filter units and/or blue filter units, but they are not limited thereto. In accordance with different embodiments, the color filter layer 206 may have a suitable number or color filter units FU of a suitable color.

Next, refer to FIG. 4, which is a schematic top-view diagram of the electronic device 10 in accordance with some embodiments of the present disclosure. In detail, FIG. 4 includes the first substrate 100 and the second substrate 200, and FIG. 4 may be an overlay diagram of the first substrate 100 shown in FIG. 1 (including elements disposed on the first substrate 100) and the second substrate 200 shown in FIG. 2 (including elements disposed on the second substrate 200). It should be understood that, in order to clearly describe the characteristics of specific elements, some elements of the electronic device 10 are omitted in the drawing, and the dashed line and solid line illustrated in the drawing may not represent the up-down relationship of the elements. In addition, the same or similar components (or elements) in the following paragraph will be denoted by the same or similar reference numbers, and their materials, manufacturing methods and functions are the same or similar to those described above, and thus they will not be repeated in the following context.

As shown in FIG. 1 to FIG. 4, in some embodiments, the first spacer 102 and/or the second spacer 202 have an elongated structure, and the first spacer 102 and the second spacer 202 intersect (cross) with each other to form a cross-shaped or an X-shaped, but it is not limited thereto. In some embodiments, part of the first spacer 102 does not overlap with the second spacer 202. Specifically, the first spacer 102 includes a first portion 102a, a second portion 102b, and a third portion 102c. The first portion 102a overlaps with the second spacer 202 in the normal direction (e.g., the Z direction) of the first substrate 100. The second portion 102b and the third portion 102c are respectively adjacent to the first portion 102a, and the first portion 102a connects between the second portion 102b and the third portion 102c. Furthermore, in some embodiments, the first portion 102a has a first length $B_1$, the second portion 102b has a second length $D_a$, the third portion 102c has a third length $D_b$. In addition, the second length $D_a$ is greater than or equal to the first length $B_1$ (the second length $D_a \geq$ the first length $B_1$), and the third length $D_b$ is greater than or equal to the first length $B_1$ (the third length $D_b >$ the first length $B_1$).

It should be noted that, the second portion 102b and/or the third portion 102c can serve as a shifting buffer region for the second spacer 202. The second portion 102b and/or the third portion 102c can reduce the probability of the second spacer 202 shifting to an area outside the first spacer 102 when an external force is applied to the panel, or reduce the probability of the layer (e.g., alignment layer, not illustrated) disposed on the first substrate 100 being scratched by the second spacer 202.

In some embodiments, the second length $D_a$ is greater than or equal to 10 micrometers (second length $D_a >$ 10 micrometers), or greater than or equal to 12 micrometers, 14 micrometers, 16 micrometers, or 18 micrometers, but it is not limited thereto. In some embodiments, the third length $D_b$ is greater than or equal to 10 micrometers (third length $D_b \geq$ 10 micrometers), or greater than or equal to 11 micrometers, 13 micrometers, 15 micrometers, or 17 micrometers, but it is not limited thereto.

In some embodiments, the ratio of the second length $D_a$ of the second portion 102b to the first length $B_1$ of the first portion 102a is greater than or equal to 1.4 (second length $D_a$/first length $B_1 \geq 1.4$), or greater than or equal to 1.6, 1.8 or 2, but it is not limited thereto. In some embodiments, the ratio of the third length $D_b$ of the third portion 102c to the first length $B_1$ of the first portion 102a is greater than or equal to 1.4 (third length $D_b$/ first length $B_1 \geq 1.4$), or greater than or equal to 1.5, 1.7 or 1.9, but it is not limited thereto.

In some embodiments, the ratio of the third length $D_b$ to the second length $D_a$ is between 0.6 and 1.7 (0.6≤third length $D_b$/second length $D_a \leq 1.7$), or between 0.8 and 1.5 (0.8≤third length $D_b$/second length $D_a \leq 1.5$), for example, may be 0.9, 1, 1.1, 1.2, 1.3 or 1.4, but it is not limited thereto.

It should be noted that, the aforementioned first length $B_1$, second length $D_a$, and third length $D_b$ are measured along a reference line on the same image (e.g., OM image). The reference line may be a line extending in any direction paralleled to the surface of the first substrate 100 (for example, the XY plane in the drawing), as long as the first length $B_1$, the second length $D_a$ and the third length $D_b$ meet the above-mentioned relationships that the second length $D_a$ is greater than or equal to the first length $B_1$, and the third length $D_b$ is greater than or equal to the first length $B_1$. In accordance with some embodiments, the extending direction $E_{102}$ of the first spacer 102 can be used as a reference line. In other words, the aforementioned first length $B_1$, second length $D_a$ and third length $D_b$ can be measured along the extending direction $E_{102}$ of the first spacer 102, but it is not limited thereto.

In some embodiments, the first spacer 102 has a length $L_1$ in the extending direction $E_{102}$, and the length $L_1$ is the sum of the first length $B_1$, the second length $D_a$, and the third length $D_b$ in the extending direction $E_{102}$. In some embodiments, the ratio of the length $L_1$ of the first spacer 102 to the width $W_1$ of the first spacer 102 is greater than or equal to 3 (length $L_1$/width $W_1 \geq 3$), or greater than or equal to 3.5, 4, or 4.5, but it is not limited thereto. In some embodiments, the ratio of the length $L_1$ of the first spacer 102 to the first length $B_1$ of the first portion 102a is between 3 and 8 (3≤length $L_1$/first length $B_1 \leq 8$), or between 4 and 7 and 4 (4≤length $L_1$/first length $B_1 \leq 7$). For example, 5 or 6, but it is not limited thereto.

According to the foregoing, in accordance with some embodiments, the first spacer 102 is designed to have a specific size, which can enhance the buffering effect for shifting or reduce the probability of the layer (e.g., alignment layer, not illustrated) on the second substrate 200 being scratched by the first spacer 102.

As shown in FIG. 4, in some embodiments, in the normal direction (e.g., the Z direction) of the first substrate 100, the light-shielding layer 204 overlaps with the first spacer 102, and the color filter layer 206 does not overlap with the first spacer 102. In some embodiments, the light-shielding layer 204 may cover the first spacer 102, the second spacer 202, the data line DL and/or the scan line SL. The above-mentioned "cover" means that the first spacer 102, the second spacer 202, the data line DL and/or the scan line SL can be covered by the light-shielding layer 204 when they are viewed in the normal direction of the first substrate 100. However, the first spacer 102, the second spacer 202, the data line DL and/or the scan line SL may be formed on the same or different substrates as the light-shielding layer 204. In some embodiments, in the normal direction of the first substrate 100, the first spacer 102 may overlap with the data line DL and/or the scan line SL. In some embodiments, the position where the first spacer 102 overlaps with the second spacer 202 (i.e. the first portion 102a) may overlap with an intersecting region of the data line DL and the scan line SL, but it is not limited thereto.

Figure 5:
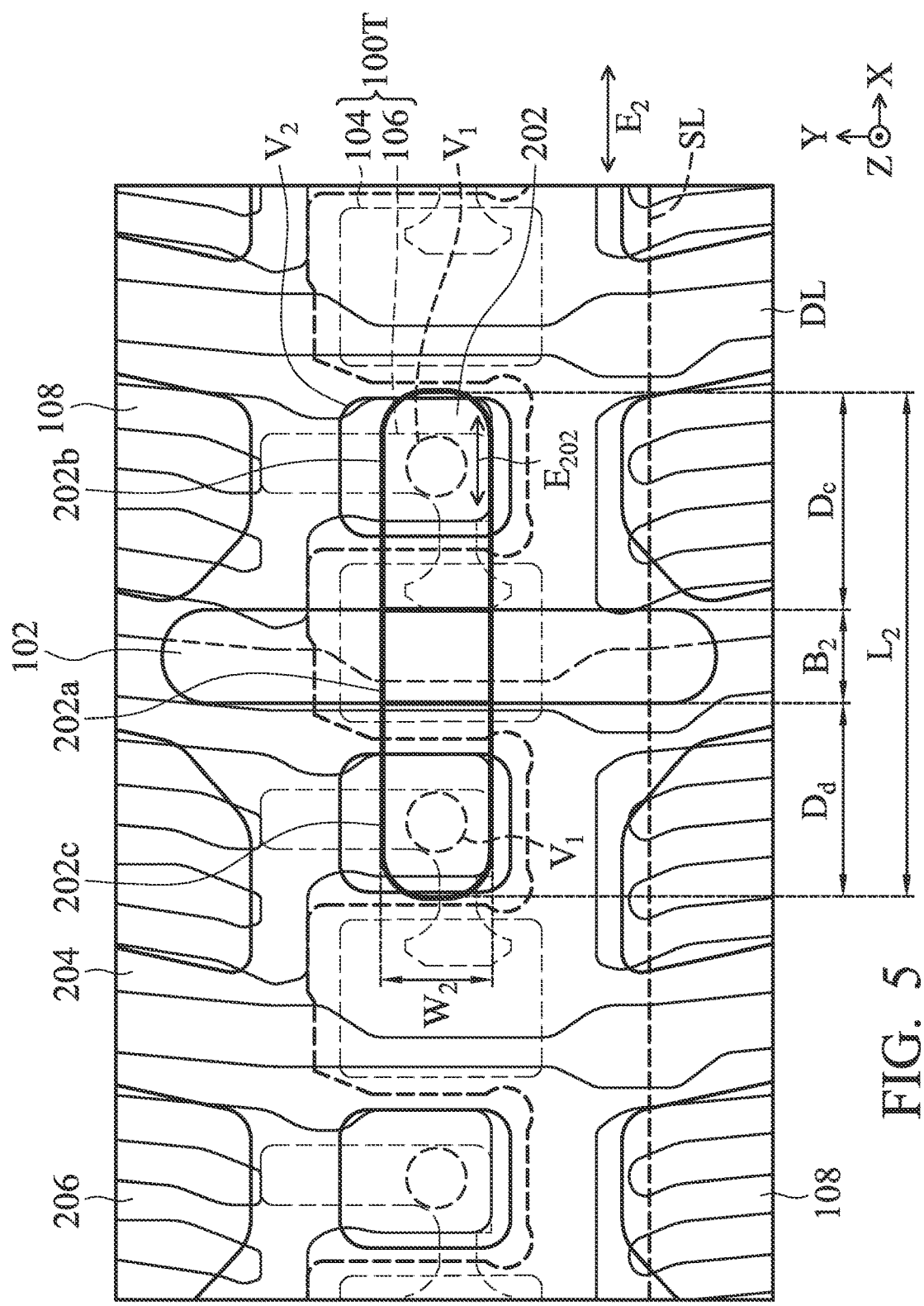
FIG. 5 is a schematic top-view diagram of an electronic device in accordance with some embodiments of the present disclosure.

Refer to FIG. 5, which is a schematic top-view diagram of the electronic device 10 in accordance with some embodiments of the present disclosure. Specifically, FIG. 5 is similar to FIG. 4, but the features are different. It should be understood that, in order to clearly describe the characteristics of specific elements, some elements of the electronic device 10 are omitted in the drawing, and the dashed line and solid line illustrated in the drawing may not represent the up-down relationship of the elements. As shown in FIG. 5, in some embodiments, part of the second spacer 202 does not overlap with the first spacer 102. In detail, the second spacer 202 may include a fourth portion 202a, a fifth portion 202b, and a sixth portion 202c. The fourth portion 202a overlaps with the first spacer 102 in the normal direction (e.g., the Z direction) of the first substrate 100, the fifth portion 202b and the sixth portion 202c are adjacent to the fourth portion 202a, and the fourth portion 202a connects between the fifth portion 202b and the sixth portion 202c. In some embodiments, the fourth portion 202a has a fourth length $B_2$, the fifth portion 202b has a fifth length $D_c$, and the sixth portion 202c has a sixth length $D_d$. In addition, the fifth length $D_c$ is greater than or equal to the fourth length $B_2$ (fifth length $D_c \geq$ fourth length $B_2$), and the sixth length $D_d$ is greater than or equal to the fourth length $B_2$ (sixth length $D_d \geq$ fourth length $B_2$).

It should be noted that, the fifth portion 202b and the sixth portion 202c of the second spacer 202 can serve as a shifting buffer region for the first spacer 102. The fifth portion 202b and the sixth portion 202c can reduce the probability of the first spacer 102 shifting to an area outside the second spacer 202 when an external force is applied to the panel, or reduce the probability of the layer (e.g., alignment layer, not illustrated) disposed on the second spacer 202 being scratched by the first spacer 102.

In some embodiments, the fifth portion 202b has a fifth length $D_c$ greater than or equal to 10 micrometers (fifth length $D_c \geq 10$ micrometers), or greater than or equal to 12 micrometers, 14 micrometers, 16 micrometers or 18 micrometers, but it is not limited thereto. In some embodiments, a sixth length $D_d$ of the sixth portion 202c is greater than or equal to 10 micrometers (sixth length $D_d \geq 10$ micrometers), or greater than or equal to 11 micrometers, 13 micrometers, 15 micrometers, or 17 micrometers, but it is not limited thereto.

In some embodiments, the ratio of the fifth length $D_c$ to the fourth length $B_2$ is greater than or equal to 1.4 (fifth length $D_c$/fourth length $B_2 \geq 1.4$), or greater than or equal to 1.5, 1.6, 1.7 or 1.8, but it is not limited thereto. In some embodiments, the ratio of the sixth length $D_d$ to the fourth length $B_2$ is greater than or equal to 1.4 (sixth length $D_d$/fourth length $B_2 \geq 1.4$), or greater than or equal to 1.5, 1.6, 1.7 or 1.8, but it is not limited thereto.

In some embodiments, the ratio of the fifth length $D_c$ of the fifth portion 202b to the sixth length $D_d$ of the sixth portion 202c is between 0.6 and 1.7 (0.6 $\leq$ fifth length $D_c$/sixth length $D_d \leq 1.7$) or between 0.8 and 1.5 (0.8 $\leq$ fifth length $D_c$/sixth length $D_d \leq 1.5$), for example, 0.9, 1, 1.1, 1.2, 1.3 or 1.4, but it is not limited thereto. It should be noted that, the aforementioned fourth length $B_2$, fifth length $D_c$, and sixth length $D_d$ are measured along a reference line on the same image (e.g., OM image). The reference line may be a line extending in any direction paralleled to the surface of the first substrate 100 (for example, the XY plane in the drawing) as long as the fourth length $B_2$, fifth length $D_c$ and sixth length $D_d$ meet the above-mentioned relationships that the fifth length $D_c$ is greater than or equal to the fourth length $B_2$, and the sixth length $D_d$ is greater than or equal to the fourth length $B_2$. In accordance with some embodiments, the extending direction $E_{202}$ of the second spacer 202 can be used as the reference line. In other words, the aforementioned fourth length $B_2$, fifth length $D_c$, and sixth length $D_d$ can be measured along the extending direction $E_{202}$ of the second spacer 202, but it is not limited thereto.

In some embodiments, the second spacer 202 has a length $L_2$ in the extending direction $E_{202}$, and the length L2 is the sum of the fourth length $B_2$, the fifth length $D_c$, and the sixth length $D_d$ in the extending direction $E_{202}$. In some embodiments, the ratio of the length $L_2$ of the second spacer 202 to a width $W_2$ of the second spacer 202 is greater than or equal to 3 (length $L_2$/width $W_2 \geq 3$), or greater than or equal to 3.5, 4, or 4.5, but it is not limited thereto. In some embodiments, the ratio of the length $L_2$ of the second spacer 202 to the fourth length $B_2$ of the fourth portion 202a is between 3 and 8 (3<length $L_2$/fourth length $B_2$<8) or between 4 and 7 (4<length $L_2$/fourth length $B_2$<7), for example, 5 or 6, but it is not limited thereto.

According to the foregoing, in accordance with some embodiments, the second spacer 202 is designed to have a specific size, which can enhance the buffering effect for shifting or reduce the probability of the layer (e.g., alignment layer, not illustrated) disposed on the first substrate 100 being scratched by the second spacer 202.

As shown in FIG. 5, in some embodiments, the extending direction $E_{202}$ of the second spacer 202 is different from the extending direction $E_{102}$ of the first spacer 102. In some embodiments, the included angle between the extending direction $E_{102}$ of the first spacer 102 and the extending direction $E_{202}$ of the second spacer 202 may be between about 45 degrees and about 90 degrees (45 degrees$\leq$included angle$\leq$90 degrees), but it is not limited thereto. In some embodiments, the included angle between the extending direction $E_{102}$ of the first spacer 102 and the extending direction $E_{202}$ of the second spacer 202 may be between about 60 degrees and about 90 degrees (60 degrees$\leq$included angle$\leq$90 degrees), but it is not limited thereto. In some embodiments, the included angle between the extending direction $E_{102}$ of the first spacer 102 and the extending direction $E_{202}$ of the second spacer 202 may be between about 80 degrees and about 90 degrees (80 degrees$\leq$included angle$\leq$90 degrees). In some embodiments, the extending direction $E_{202}$ of the second spacer 202 is substantially the same as an extending direction $E_2$ of the scan line SL. In some embodiments, in the normal direction of the first substrate 100, the second spacer 202 may overlap with the data line DL and/or the scan line SL, and the above-mentioned "overlap with" means that the two at least partially overlap. In this way, the length of the second spacer 202 can be appropriately extended to increase the buffer space, and the second spacer 202 does not significantly occupy the aperture area of the pixel unit. In some embodiments, the position where the second spacer 202 overlaps with the first spacer 102 (i.e. the fourth portion 202a) may overlap with an intersecting region of the data line DL and the scan line SL, but it is not limited thereto.

Figure 6:
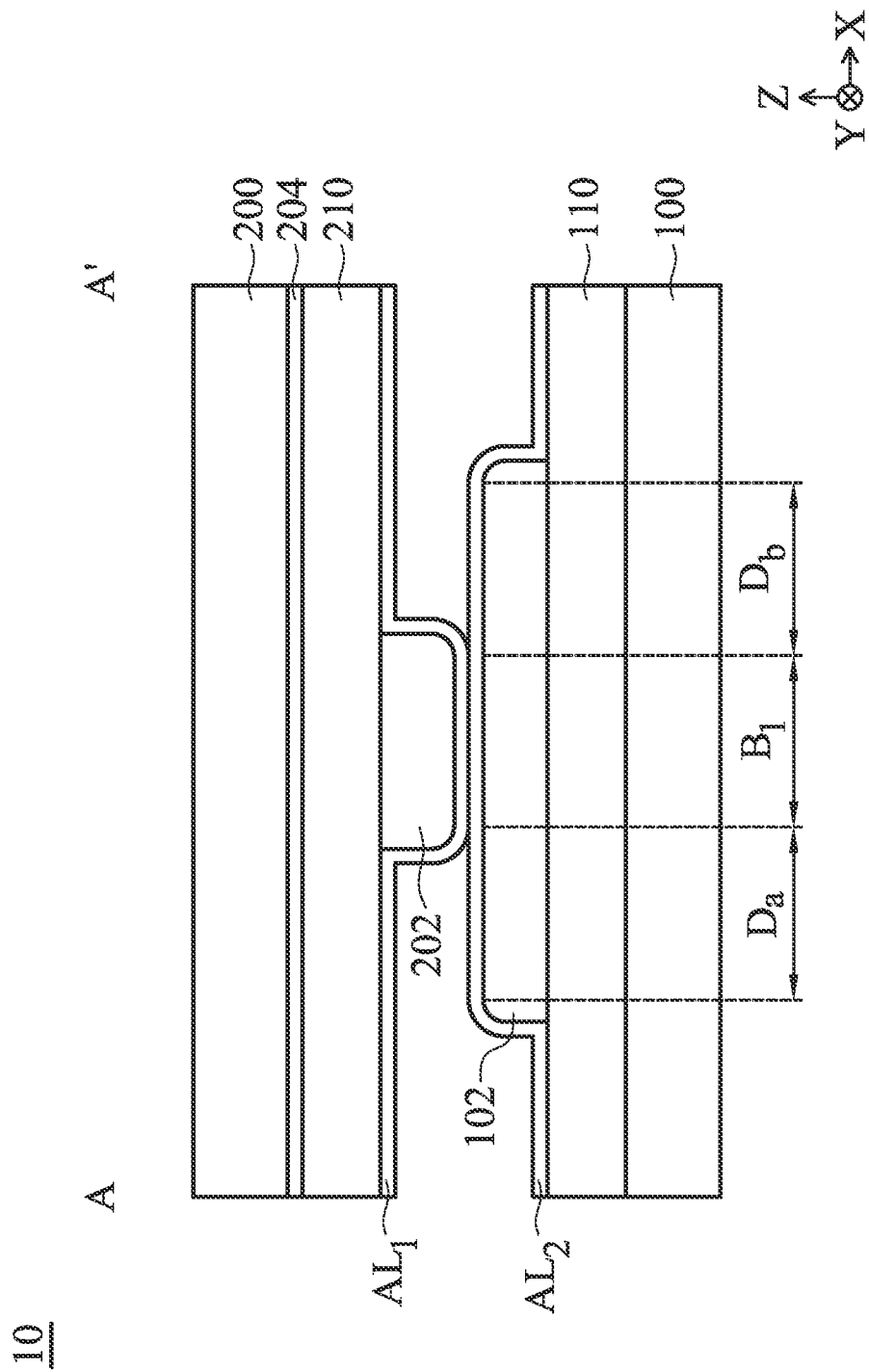
FIG. 6 is a schematic cross-sectional diagram of an electronic device in accordance with some embodiments of the present disclosure.

Refer to FIG. 6, which is a schematic cross-sectional diagram of the electronic device 10 in accordance with some embodiments of the present disclosure. The cross-sectional structure shown in FIG. 6 may correspond to the section line A-A' in FIG. 4. It should be understood that, some elements of the electronic device 10 are omitted in the drawing for clarity. As shown in FIG. 6, the first spacer 102 and the second spacer 202 are disposed between the first substrate 100 and the second substrate 200, the first spacer 102 and the second spacer 202 interlace with each other. In some embodiments, the planarization layer 110 is disposed between the first spacer 102 and the first substrate 100. In some embodiments, a planarization layer 210 is disposed between the second spacer 202 and the second substrate 200. In some embodiments, the planarization layer 110 may provide a planar surface for disposing the first spacer 102, or improving the structural flatness of the first spacer 102. In some embodiments, the planarization layer 210 may provide a planar surface for disposing the second spacer 202, or improving the structural flatness of the second spacer 202. In some embodiments, the planarization layer 210 may be disposed between the second spacer 202 and the light-shielding layer 204. It should be noted that, if the structure of the first spacer 102 is not flat (or planar), the opposite spacer (for example, the second spacer 202) may be easily shifted (or displaced) due to an external force, affecting other layers (for example, a first alignment layer $AL_1$, but it is not limited thereto) disposed on the first substrate 100. It should be noted that, if the structure of the second spacer 202 is not flat, the opposite spacer (for example, the first spacer 102) may be easily displaced due to an external force, affecting other layers disposed on the second substrate 200 (for example, a second alignment layer $AL_2$, but it is not limited thereto). Furthermore, the material of the planarization layer 210 may be similar to the material of the planarization layer 110, and will not be repeated herein. Furthermore, the material of the planarization layer 210 may be the same as or different from the material of the planarization layer 110. In some other embodiments (not illustrated), the planarization layer 110 or the planarization layer 210 can be removed.

In some embodiments, the first alignment layer $AL_1$ may be disposed on the first spacer 102 and a portion of the planarization layer 110, and the second alignment layer $AL_2$ may be disposed on the second spacer 202 and a portion of the planarization layer 210. In some embodiments, a dielectric layer (such as a liquid-crystal layer or other dielectric layers, not illustrated) may be disposed between the first alignment layer $AL_1$ and the second alignment layer $AL_2$. In some embodiments (not illustrated), the thickness of the first alignment layer $AL_1$ corresponding to (or disposing on) the first spacer 102 is smaller than the thickness of the first alignment layer $AL_1$ corresponding to (or disposing on) the planarization layer 110. In some embodiments (not illustrated), the thickness of the second alignment layer $AL_2$ corresponding to (or disposing on) the second spacer 202 is smaller than the thickness of the second alignment layer $AL_2$ corresponding to (or disposing on) the planarization layer 210. In some embodiments, in the cross section, the first spacer 102 and/or the second spacer 202 may have curved edges, but it is not limited thereto.

Figure 7:
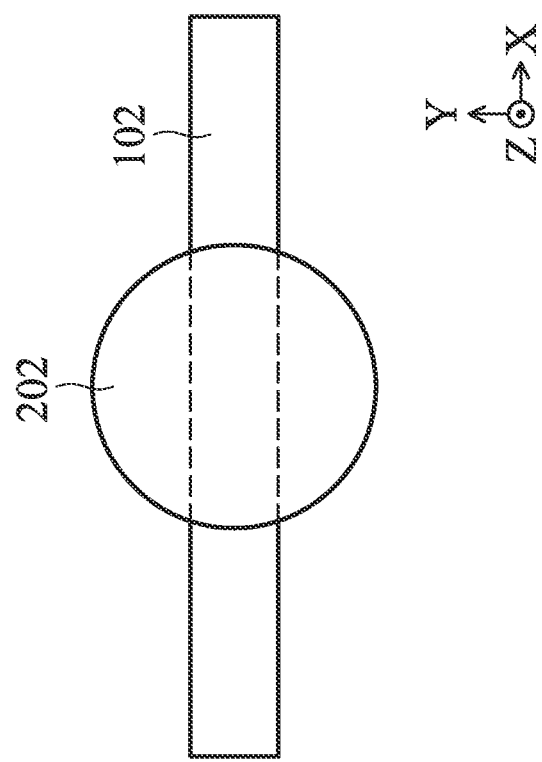
FIG. 7 is a schematic top-view diagram of some elements of an electronic device in accordance with some embodiments of the present disclosure.
Figure 8:
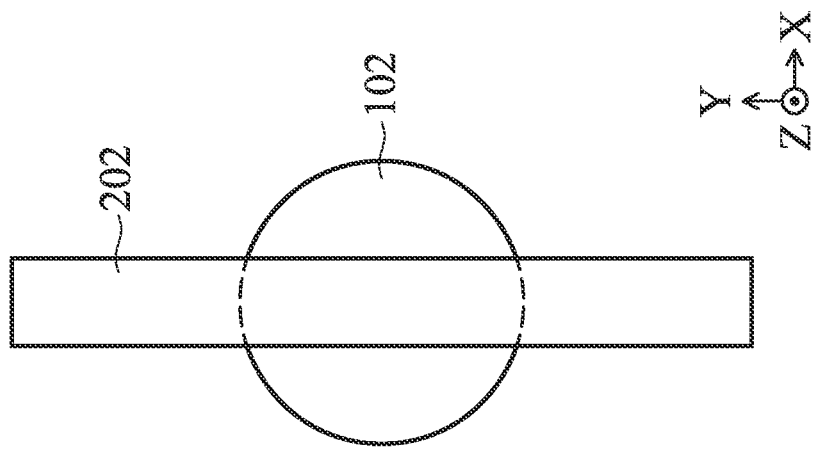
FIG. 8 is a schematic top-view diagram of some elements of an electronic device in accordance with some embodiments of the present disclosure.

Refer to FIG. 7 and FIG. 8, which are schematic top-view diagrams of the first spacer 102 and the second spacer 202 of the electronic device in accordance with some embodiments of the present disclosure. As shown in FIG. 7, in some embodiments, the first spacer 102 may have an elongated structure, and the second spacer 202 may have a circle shape structure (such as cylindrical structure), but it is not limited thereto. As shown in FIG. 8, in some embodiments, the first spacer 102 may have a circle shape structure (such as cylindrical structure), and the second spacer 202 may have an elongated structure, but it is not limited thereto. In the embodiments shown in FIG. 7 and FIG. 8, the first spacer 102 has part that does not overlap with the second spacer 202, and the second spacer 202 also has part that does not overlap with the first spacer 102. As described above, these parts (or portions) can serve as shifting buffer regions for the first spacer 102 and/or the second spacer 202.

It should be understood that, in accordance with the embodiments of the present disclosure, the shapes of the first spacer 102 and the second spacer 202 are not limited to those depicted in FIG. 7 and FIG. 8. In accordance with some embodiments, the first spacer 102 and the second spacer 202 can have any other suitable shapes (such as rectangular, polygonal, or arc-shaped, but it is not limited thereto) according to needs, as long as the shape of the first spacer 102 can meet the aforementioned relationships that the second length $D_a$ is greater than or equal to the first length $B_1$, and the third length $D_b$ is greater than or equal to the first length $B_1$ or the shape of the second spacer 202 can meet the aforementioned relationships that the fifth length $D_c$ is greater than or equal to the fourth length $B_2$, and the sixth length $D_d$ is greater than or equal to the fourth length $B_2$.

Figure 9:
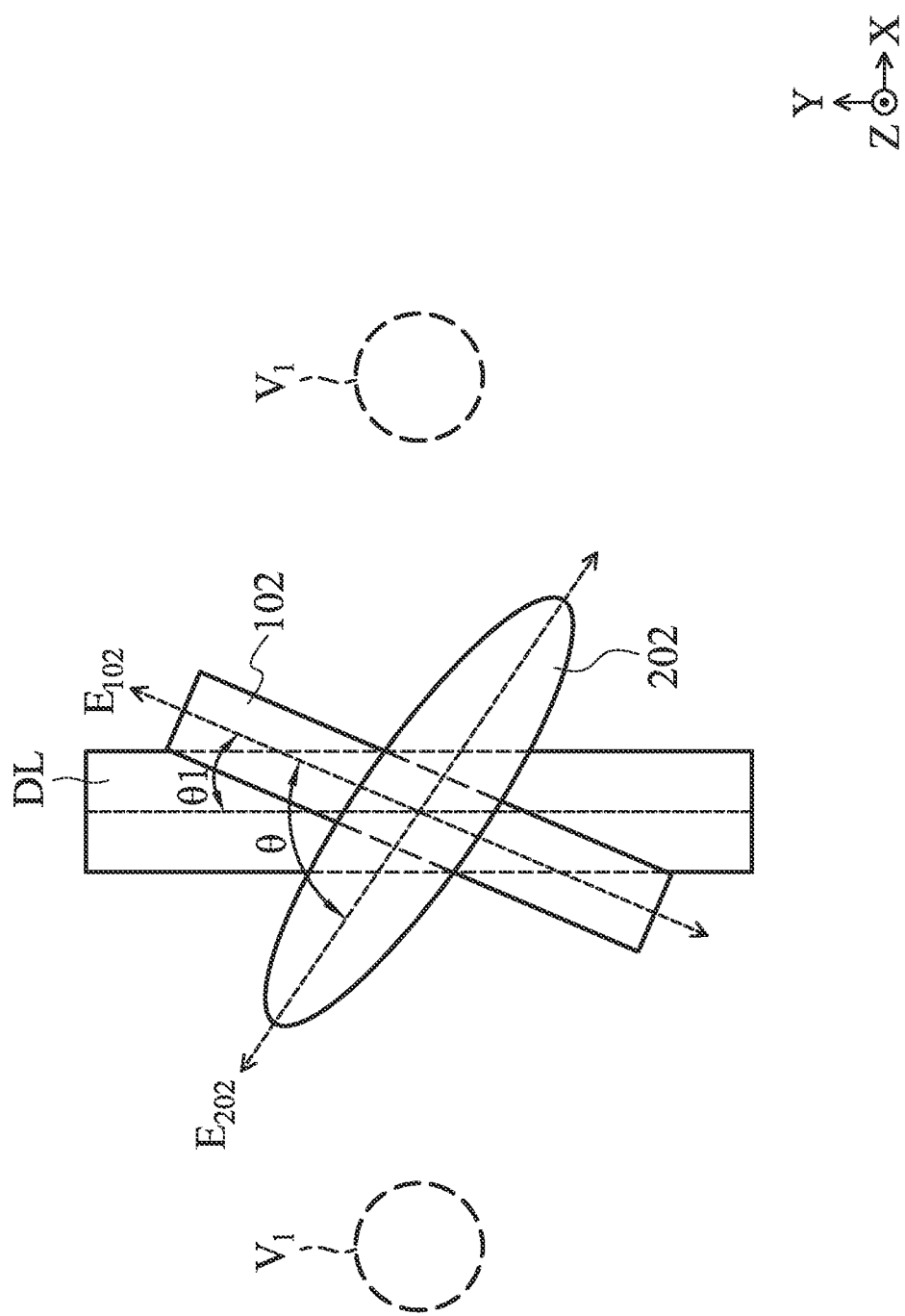
FIG. 9 is a schematic top-view diagram of some elements of an electronic device in accordance with some embodiments of the present disclosure.

Refer to FIG. 9, which is a schematic top-view diagram of the first spacer 102, the second spacer 202, the data line DL, and the first through holes $V_1$ of the electronic device in accordance with some embodiments of the present disclosure. As shown in FIG. 9, in some embodiments, the included angle between the extending direction $E_{102}$ of the first spacer 102 and the extending direction $E_{202}$ of the second spacer 202 is between 45 degrees and 90 degrees (45 degrees≤included angle θ≤90 degrees), or between 60 degrees to 90 degrees (60 degrees≤included angle θ≤90 degrees), or between 80 degrees to 90 degrees (80 degrees≤included angle θ≤90 degrees), but it is not limited thereto. In some embodiments, the included angle θ1 between the extending direction $E_{102}$ of the first spacer 102 and the extending direction $E_1$ of the data line DL is between 0 degree and 45 degrees (0 degree≤included angle θ1≤45 degrees), or between 10 degrees and 45 degrees (10 degrees≤included angle θ1≤45 degrees), or between 10 degrees and 30 degrees (10 degrees≤included angle θ1≤30 degrees), but it is not limited thereto. In some embodiments, the overlapping area of the first spacer 102 and the second spacer 202 is substantially between two adjacent first through holes $V_1$, and the overlapping area of the first spacer 102 and second spacer 202 is substantially located on a connecting line of two adjacent first through holes $V_1$, and the connecting line may be substantially parallel to the X direction, but it is not limited thereto.

In accordance with the embodiments of the present disclosure, an optical microscopy (OM), a scanning electron microscope (SEM), a film thickness profiler (a-step), an ellipsometer or another suitable methods may be used to measure the width, length, thickness of each element or the distance between elements. Specifically, in some embodiments, a scanning electron microscope can be used to obtain any cross-sectional image including the elements to be measured, and the width, length, thickness or distance between the elements in the image can be measured.

Although some embodiments of the present disclosure and their advantages have been described in detail, it should be understood that various changes, substitutions and alterations can be made herein without departing from the spirit and scope of the disclosure as defined by the appended claims. The features of the various embodiments can be used in any combination as long as they do not depart from the spirit and scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods or steps. In addition, each claim constitutes an individual embodiment, and the claimed scope of the present disclosure includes the combinations of the claims and embodiments. The scope of protection of present disclosure is subject to the definition of the scope of the appended claims. Any embodiment or claim of the present disclosure does not need to meet all the purposes, advantages, and features disclosed in the present disclosure.

What is claimed is:

1. An electronic device, comprising:
 a first substrate;
 a second substrate disposed opposite to the first substrate;
 a data line disposed on the first substrate and extending along a first direction;
 a drain electrode disposed on the first substrate and having a protruding part;
 a scan line disposed on the first substrate, wherein the scan line has an extension part extending along a second direction and a gate electrode extending along the first direction;
 a first spacer disposed on the first substrate; and
 a second spacer disposed on the second substrate and between the first spacer and the second substrate, part of the first spacer not overlapping with the second spacer, and the first spacer comprising:
   a first portion overlapping with the second spacer in a normal direction of the first substrate;

a second portion; and
a third portion, and the first portion connecting between the second portion and the third portion;
wherein the gate electrode has a connection side connecting the extension part, and the connection side has a curved side,
wherein the second spacer overlaps the gate electrode, and the second spacer does not overlap the extension part,
wherein along the second direction, a length of the second spacer is greater than a width of the gate electrode,
wherein a portion of the first spacer overlaps with the data line, and another portion of the first spacer does not overlap with the data line,
wherein the data line has a first part and a second part, in the normal direction of the first substrate, the first part overlaps with the first portion, the second part overlaps with the second portion, and an overlapping area of the first part and the first portion is less than an overlapping area of the second part and the second potion, wherein in the second direction, a maximum width of the first part is less than a maximum width of the second part, and
wherein the protruding part is adjacent to the first part of the data line, and in the second direction, a minimum distance between the protruding part and the first part is greater than 0 and less than the maximum width of the first portion.

2. The electronic device as claimed in claim 1, wherein the data line has a concave edge, and the concave edge overlaps with the first portion.

3. The electronic device as claimed in claim 1, wherein the gate electrode overlaps with first portion.

4. The electronic device as claimed in claim 1, wherein the second portion overlaps with the gate electrode.

5. The electronic device as claimed in claim 1, wherein the first portion overlaps with an intersecting region of the data line and the scan line.

6. The electronic device as claimed in claim 1, further comprising a transistor disposed on the first substrate and having a semiconductor layer, wherein the semiconductor layer overlaps with the first part.

7. The electronic device as claimed in claim 1, further comprising a color filter layer disposed on the second substrate, the color filter layer comprising a plurality of color filter units, wherein the first spacer and the second spacer do not overlap with the plurality of color filter units.

8. The electronic device as claimed in claim 1, further comprising a first planarization layer and a first alignment layer disposed on first substrate, the first alignment layer disposed on the first planarization layer and the first spacer, wherein a thickness of the first alignment layer corresponding to the first spacer is smaller than a thickness of the first alignment layer corresponding to the first planarization layer.

9. The electronic device as claimed in claim 8, further comprising:
a second planarization layer disposed between the second spacer and the second substrate.

10. The electronic device as claimed in claim 1, wherein the second spacer comprises:
a fourth portion overlapping with the first spacer in the normal direction of the first substrate;
a fifth portion; and
a sixth portion, and the fourth portion connecting between the fifth portion and the sixth portion;
wherein the first portion has a first length, the second portion has a second length, the third portion has a third length, the second length is greater than or equal to the first length, and the third length is greater than or equal to the first length,
wherein the fourth portion has a fourth length, the fifth portion has a fifth length, the sixth portion has a sixth length, the fifth length is greater than or equal to the fourth length, and the sixth length is greater than or equal to the fourth length.

11. The electronic device as claimed in claim 10, wherein the second length is greater than or equal to 10 micrometers, or the third length is greater than or equal to 10 micrometers.

12. The electronic device as claimed in claim 10, wherein a ratio of the second length to the first length is greater than or equal to 1.4, or a ratio of the third length to the first length is greater than or equal to 1.4.

13. The electronic device as claimed in claim 10, wherein a ratio of the third length to the second length is between 0.6 and 1.7.

14. The electronic device as claimed in claim 10, wherein a ratio of the fifth length to the fourth length is greater than or equal to 1.4, or a ratio of the sixth length to the fourth length is greater than or equal to 1.4.

15. The electronic device as claimed in claim 1, wherein a ratio of a length of the first spacer to a width of the first spacer is greater than or equal to 3.

16. The electronic device as claimed in claim 1, wherein an extending direction of the first spacer is different from an extending direction of the second spacer.

17. The electronic device as claimed in claim 1, wherein an extending direction of the first spacer is the same as an extending direction of the data line.

18. The electronic device as claimed in claim 1, further comprising:
a scan line disposed on the first substrate, wherein an extending direction of the second spacer is the same as an extending direction of the scan line.

19. The electronic device as claimed in claim 1, wherein a ratio of a length of the second spacer to a width of the second spacer is greater than or equal to 3.

20. The electronic device as claimed in claim 1, further comprising:
a light-shielding layer disposed on the second substrate, wherein the light-shielding layer overlaps with the second spacer.

* * * * *